(12) United States Patent
Dusza

(10) Patent No.: US 6,511,228 B2
(45) Date of Patent: Jan. 28, 2003

(54) OIL ANNULUS TO CIRCUMFERENTIALLY EQUALIZE OIL FEED TO INNER RACE OF A BEARING

(75) Inventor: Edward Dusza, Longueuil (CA)

(73) Assignee: Pratt & Whitney Canada Corp., Longueuil (CA)

(*) Notice: Subject to any disclaimer, the term of this patent is extended or adjusted under 35 U.S.C. 154(b) by 1 day.

(21) Appl. No.: 09/850,006

(22) Filed: May 8, 2001

(65) Prior Publication Data
US 2002/0168124 A1 Nov. 14, 2002

(51) Int. Cl.$^7$ ............................................... F16C 33/66
(52) U.S. Cl. ........................................................ 384/475
(58) Field of Search .................................. 384/462, 465, 384/466, 467, 474, 475, 499, 502, 505, 506

(56) References Cited

U.S. PATENT DOCUMENTS

| | | | |
|---|---|---|---|
| 2,217,801 A | * 10/1940 | Katcher | 384/475 |
| 3,980,359 A | 9/1976 | Wetherbee, Jr. | |
| 4,194,797 A | 3/1980 | Hörmann et al. | |
| 4,334,720 A | * 6/1982 | Signer | 384/475 |
| 4,345,799 A | 8/1982 | Crofts | |
| 4,428,628 A | 1/1984 | Brown | |
| 4,463,994 A | * 8/1984 | Eliason et al. | 384/506 |
| 5,106,209 A | * 4/1992 | Atkinson et al. | 384/475 |
| 5,119,905 A | 6/1992 | Murray | |
| 5,183,342 A | * 2/1993 | Daiber et al. | 384/462 |
| 5,399,027 A | * 3/1995 | Ijuin et al. | 384/475 |

FOREIGN PATENT DOCUMENTS

EP  0 527 052 A1  5/1992

* cited by examiner

Primary Examiner—Thomas R. Hannon
(74) Attorney, Agent, or Firm—Wayne H. Yan; Ogilvy Renault (PWC)

(57) ABSTRACT

A ball bearing assembly has an outer ring and an inner ring defining the respective outer and inner races, and a plurality of balls separated on the circumference by a cage ring. The inner ring is split into a loaded half and a non-loaded half. The cage lands on the inner ring halves support the cage ring. An annular groove having a non-rectangular cross-section is disposed at the inner ring bore and at the split face. A plurality of radial grooves extend in the split face of one inner ring half to form radial passages between the annular groove and the inner race for directing oil under centrifugal forces collected in the annular groove, into the inner race. Each radial passage has an aperture in the annular groove located in an intermediate section thereof so that the bottom section of the annular groove acts as a reservoir to feed all the radial passages as well as provide a longer residence time for the oil on loaded inner ring surfaces. The annular reservoir circumferentially equalizes the oil supply to the radial split face passages and increases heat transfer to the oil since it is located in the loaded inner ring half where substantial frictional heat generation occurs. As a result, a preferential cooling of the loaded half of the inner ring is provided. The invention can be broadly applied to cool and lubricate rotating parts in rotary machines, especially in high speed applications.

19 Claims, 2 Drawing Sheets

OIL ANNULUS TO CIRCUMFERENTIALLY EQUALIZE OIL FEED TO INNER RACE OF A BEARING

FIELD OF THE INVENTION

The present invention relates to means for cooling and lubricating rotating objects in rotary machines, especially for high-speed applications, and more particularly to means for cooling and lubricating bearings for jet engines, turbines and the like.

BACKGROUND OF THE INVENTION

Lubrication is important to rotary machines, particularly to bearings at high-speed applications. Ball bearings are popularly used in gas engines and turbines. In such applications, the ball bearings generally work at very high speeds under high load and have to meet the requirements of very demanding rotor dynamics. Obviously, the life of a bearing is directly related to the adequate lubrication and cooling of its wear surfaces. A ball bearing generally has a cage ring disposed between an outer ring and an inner ring. The cage ring includes pockets to locate individual balls in a circumferentially spaced relationship between an outer race and an inner race defined by the respective outer and inner rings. The cage ring is often radially restrained by the inner ring. Experience has shown that for such cage, a non-uniform cage ring support by the inner ring can occur. Due to higher temperatures of the loaded half of the inner ring, its land diameter guiding the cage, is larger and the cage is supported predominantly on the single land rather than on the two lands. A residual cage ring unbalance force together with the reaction applied to the cage by a single inner ring land generate cage ring tilting moment to produce impact loading between one or a number of the bearing balls and the pockets of the cage ring retaining these particular bearing balls. The impact loading will result in distress on and damage to the bearing balls and the pockets of the cage ring.

Efforts have been made to improve the lubricating system for high speed ball bearings. One example of the lubricating system is described in U.S. Pat. No. 3,980,359, issued to Wetherbee, Jr. on Sep. 14, 1976. Wetherbee, Jr. describes a lubricating system for high speed ball bearings. The ball bearing includes an outer ring, a split ring, a split inner ring having a fore ring and an aft ring, a cage and a plurality of spherical balls journalled therebetween. The lubricating system includes forming the cage into the scalloped ring and rotatably supporting it in an annular channel formed between the split inner ring halves. The lubricating system further includes machined passageways in the split face to communicate the channel and a V-shaped annular oil collecting groove in the most inner surface of the inner ring. The side walls of the scalloped ring and the channel are dimensioned to define a gap for leading oil to and from internally of the bearing.

Annuluses have been used in rotating objects of rotary machines, particularly in high speed applications, for collecting lubricant fluids and maintaining an amount of the lubricant fluids therein under centrifugal forces to ensure the lubricant fluids supply. U.S. Pat. No. 5,119,905, issued to Murray on Jun. 9, 1992 describes an accessory drive spline lubrication system for a turbine engine reduction gearbox. In order to prevent the continuing loss of engine oil resulting from an ineffective seal, the spline area of a drive shaft is provided with oil by an annular reservoir which collects oil shot from a nozzle. The oil under centrifugal forces is maintained in the annular reservoir and the oil axially enters the spline area when more oil is collected in the annular reservoir.

Nevertheless, further improvements for a simple and cost effective solution of the lubrication and cooling of high speed rotating objects in rotary machines, especially of high speed bearings, are still desired.

SUMMARY OF THE INVENTION

One object of the present invention is to provide a means for directing cooling and lubricant fluids under centrifugal forces in a rotary machine.

Another object of the present invention is to provide means to improve cooling and lubricating ball bearings with split inner rings.

A further object of the present invention is to provide improved ball bearings using only features designed at the vicinity of the inner ring split faces.

In accordance with one aspect of the present invention, a channel for collecting and directing cooling and lubricant fluids under centrifugal forces in a rotary machine is provided. The channel comprises an annular groove disposed in an annular inner surface of a rotating object of the rotary machine. The annular groove has in a cross-section, an open side towards a rotating axis of the rotating object, a first section radially distal from the open side and a second section disposed radially between the open side and the first section. The rotating object includes at least one radial passage extending therein to communicate with the annular groove and an area of the object to be lubricated. The at least one radial passage includes an aperture in the annular groove located in the second section such that the first section of the annular groove acts as a reservoir when cooling and lubricant fluids under the centrifugal forces are collected in the annular groove and then delivered through the at least one radial passage into the area.

In accordance with another aspect of the present invention, a ball bearing includes an outer ring defining an outer race; an inner ring defining an inner race. A plurality of balls are retained between the outer and inner rings. An annular groove is disposed on an innermost surface of the inner ring. The annular groove has in a cross-section, an open side, a first section disposed radially distal from the open side and a second section disposed radially between the open side and the first section. A plurality of radial passages extend through the inner ring from the annular groove to the inner race. Each of the radial passages has an aperture in the second section of the annular groove.

The cross-section of the annular groove is preferably non-rectangular.

In accordance with one embodiment of the present invention, a ball bearing includes an outer ring defining an outer race and an inner ring including a pair of juxtaposed first and second ring elements defining an inner race. The first and second ring elements have flat surfaces abutting each other, usually called split faces. A plurality of balls are retained between the outer and inner rings and circumferentially spaced apart from one another by a cage ring disposed between the outer ring and the inner ring. The cage ring is often piloted on outermost cylindrical surfaces of the inner ring elements, usually called cage lands. The diameter of the cage lands is slightly smaller than the inner diameter of the cage, such that there is a small annular gap between the cage ring and the inner ring cage lands. An annular groove is disposed on an innermost surface of the inner ring at abutting faces of the first and second ring elements. The annular groove has a non-rectangular cross-section with an open side towards a rotating axis of the bearing. The non-rectangular cross-section is defined by first and second sections in a radially disposed relationship and the second section includes the open side. On the abutting face of the first or second ring elements, a plurality of grooves radially extend therethrough to form radial passages between the inner race and the annular groove when the first and second ring elements are placed together. Each of the radial passages has an aperture in the annular groove located in the second section of the annular groove such that the first section of the annular groove acts as a reservoir when cooling and lubricant fluids under a centrifugal pumping force are collected in the annular groove and then delivered through the radial passages into the inner race.

With such a configuration, the lubricant fluids, preferably oil, fed into the inner race are circumferentially balanced by the annular reservoir, which will provide more efficient cooling and lubrication to the sliding points within the bearing. For the same purpose, the number of radial passages should not be too few and will depend on bearing size, speed and load. In a presented embodiment, 14 radial passages are provided. The annular groove advantageously provides not only a reservoir function but also additional cooling capability, especially if it is located at the bore of the loaded half of the inner ring. Such an arrangement allows minimization of temperature difference between loaded and non-loaded inner ring halves and provides uniform and stable support to the cage. Also, due to better oil distribution, the contact zone temperatures will be reduced significantly. Therefore, the better cooling and lubrication will improve bearing performance and the bearing life.

Other advantages and features of the present invention will be better understood with reference to a preferred embodiment described hereinafter.

BRIEF DESCRIPTION OF THE DRAWINGS

Having thus generally described the nature of the present invention, reference will now be made to the accompanying drawings showing preferred embodiments by way of illustration, in which.

DETAILED DESCRIPTION OF THE PREFERRED EMBODIMENTS

Figure 1:
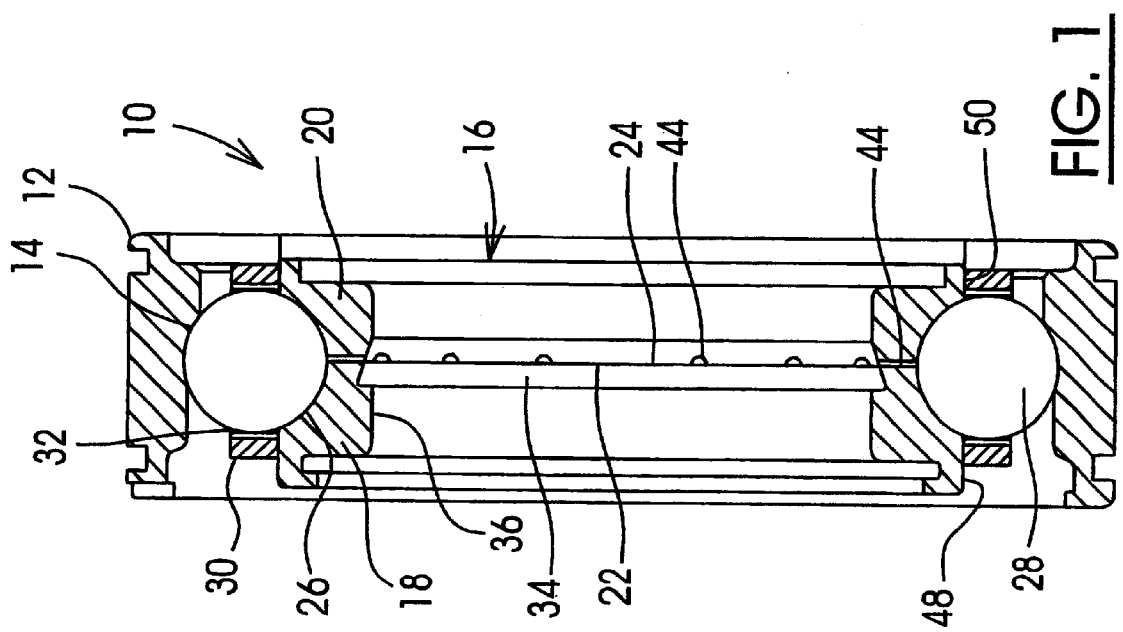
FIG. 1 is a cross-sectional view of a ball bearing assembly incorporating one embodiment of the present invention.
Figure 2:
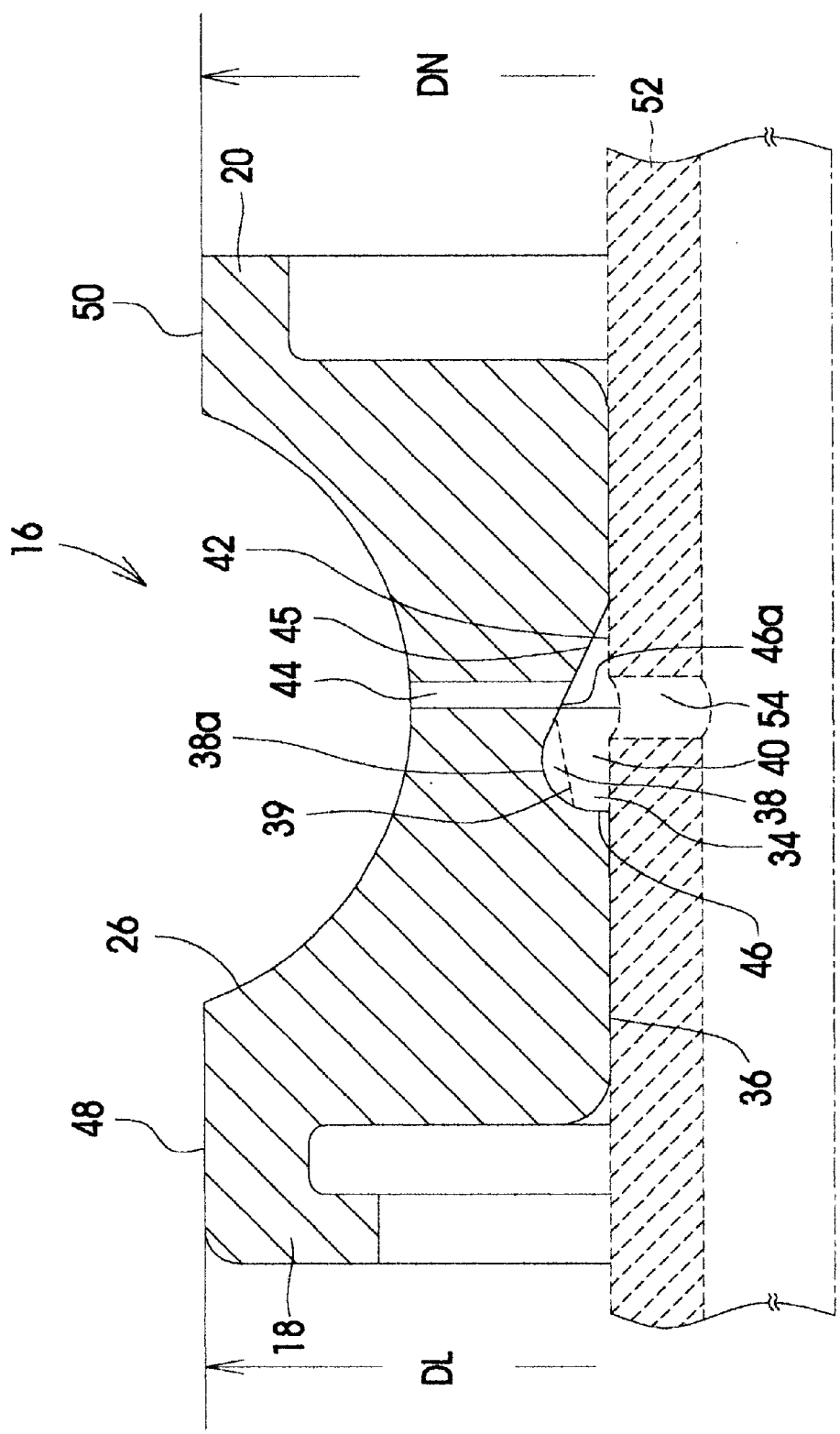
FIG. 2 is an enlarged partial cross-sectional view of an inner ring of the ball bearing assembly shown in FIG. 1.

Referring to the drawings, particularly to FIGS. 1 and 2, a ball bearing assembly, generally indicated at numeral 10, includes an outer ring 12 which is supported, for example, by a stationary casing (not shown). The outer ring 12 has an annular inner surface defining an outer race 14. The ball bearing assembly 10 further includes an inner ring 16 which is formed with a pair of juxtaposed first and second ring elements 18 and 20 having respective flat surfaces 22 and 24 abutting each other and usually called split faces. An inner race 26 is defined on an annular outer surface of the inner ring 16. During bearing operation races 14 and 26 transmit an external axial load. Therefore, the first inner ring element 18 is called a loaded inner ring half while the second inner ring element 20 is a non-loaded inner ring half.

A plurality of bearing balls 28 are retained between the outer and inner races 14 and 26 and are equally, circumferentially spaced apart from one another by a cage ring 30. The cage ring 30 generally is a band ring having circular apertures extending radially therethrough, and equally, circumferentially spaced apart from one another to form pockets 32 for retaining the individual bearing balls 28 in position.

As shown in FIG. 2, the two outermost cylindrical surfaces 48 and 50, usually called inner ring cage lands, have diameters DL and DN respectively. Both these diameters are slightly smaller than the inner diameter of the cage ring 30 so that a uniform cage/land clearance exists in a manufactured bearing. In a mounted bearing, at operation, substantial heat is generated at the race 26 of the loaded inner ring half 18 and diameter DL of land 48 expands more thermally than the diameter DN of land 50 on the non-loaded inner ring half 20 since heat generated at the race 26 of the non-loaded inner ring half 20 is insignificant. As a result, the cage land 50 of the second inner ring element 20, forms a larger clearance with the cage than the land 48 on the first, loaded inner ring half 18. The inner ring 16 is mounted on a rotating shaft 52 (shown in FIG. 2 only) of a rotary machine, or of a gas turbine engine as in this particular embodiment, to rotate together.

In annular groove 34 is formed in the inner ring 16 and is disposed on an innermost surface 36 thereof at the edges of the split faces 22, and 24 of the respective first and second inner ring elements 18 and 20. The annular groove 34 has a now-rectangular cross-section formed by the side 42 opened towards the rotating shaft 52, a first section 38 and a second section 40 which is defined radially between the open side 42 and the first section 38. The broken line 39 in FIG. 2 illustrates the boundary of the first and second sections 38 and 40. In this particular embodiment, the first section 38 is defined by the curved surface 38a of the first inner ring element 18, to form a shallow annular reservoir for collecting oil under centrifugal forces. The second section 40 is defined by the radial surface 46 at the side of the first inner ring element 18 and the sloped surface 45 at the side of the second inner ring element 20. Both surfaces 45 and 46 are smoothly joined with the curved surface 38a to ensure that the oil delivered through the holes 54 in the rotating shaft 52 under centrifugal forces is guided to the annular reservoir 38.

A plurality of grooves 44 radially extend on the split face 24 of the second inner ring element 20 therethrough, between the annular groove 34 and the inner race 26. When the first and second inner ring elements 18 and 20 are placed together to form the inner ring 16, the radial grooves 44 form individual radial passages for directing oil under centrifugal forces collected in the annular groove 34, into the inner race 26 to lubricate and cool the inner race 26, and all the other contact points between balls and cage, cage and inner ring lands and balls and outer race 14.

Each radial passage formed by the groove 44 has an aperture 46a in the annular groove 34 located in the split faces. Thus, the annular reservoir 38 in the first inner ring element 18 has a radial depth greater than the radial distance from the innermost surface 36 of the inner ring 16 to the aperture 46a. In such a geometrical arrangement, the lubricant oil from the rotating shaft side is centrifugally pumped into the annular groove 34 and resides in the annular reservoir 38 before entering the radial passages formed by the grooves 44.

Figure 3:
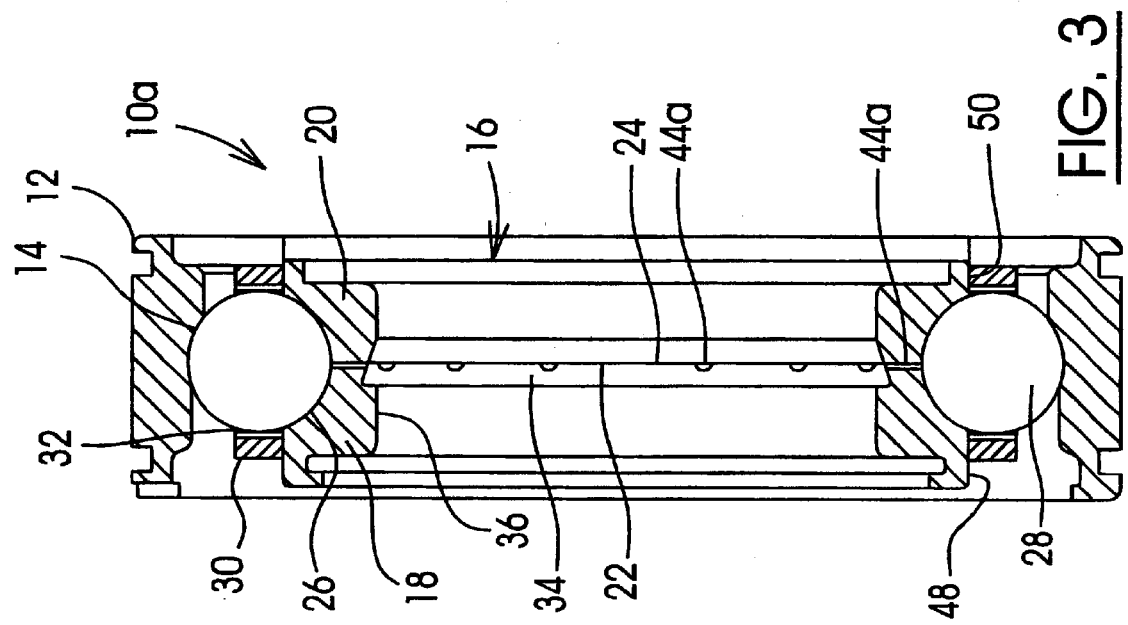
FIG. 3 is a ball bearing assembly according to another preferred embodiment of the present invention.

FIG. 3 shows another embodiment of the present invention. The ball bearing assembly 10a has a configuration similar to the ball bearing assembly 10 shown in FIGS. 1 and 2, with similar parts indicated by the same numerals as used in FIG. 1, and will not be redundantly described. The difference lies in that the radial grooves 44a are formed on the abutting surface 22 of the loaded inner ring element 18, in contrast to the radial grooves 44 formed in the abutting surface 24 of the non-loaded inner ring element 20 as shown in FIG. 1. The arrangement of FIG. 3 still comprises the annular reservoir of oil.

In either embodiments shown in FIG. 1 or 3, the annular groove 34 in the loaded inner ring half 18 serves as a lubricant oil collecting channel, to circumferentially equalize the lubricant oil supply to each of the split face radial grooves 44. It also makes up a substantial annulus of oil close to the inner race/balls contacts to cool the entire loaded inner ring half 18. For the same purpose, the number of radial passages formed by the grooves 44 should not be too few since they transmit the oil on the split surface of the loaded inner ring 18 and the larger this surface is, the better cooling of the loaded inner ring 18 exists. Also better coverage of all other contact locations with lubricating and cooling oil can be achieved by a greater number the radial passages 44. In the particular embodiment of FIGS. 1 and 3 the number of radial passages is 14.

The deeper side of the annular groove 34, that is the curved surface 38a, creates the reservoir 38 to improve the function of the annular groove 34 by providing a longer residence time for the lubricant oil in the annular groove 34, which further improves the circumferential equalization of the oil supply, resulting from more continuous oil coverage on the circumference of the inner ring 16, and provides a much better cooling result to reduce the bearing temperature, particularly that of the loaded half of the inner bearing. The annular groove 34 does not generate a stress issue if the inner ring 16 is radially thick and its hoop stress is within limits.

The present invention is particularly applicable to presently existing production bearings which could have tighter curvatures and high heat generation at the inner race, where substantial sliding occurs. Incorporating the present invention into the existing production bearings can avoid waiting for the complete redesign of the bearings. The present invention can readily incorporate other improvements of bearings, particularly improvements to the internal geometry.

It is further understood that the spirit of the invention relates to the channel for directing cooling and lubricant fluids in rotary machines and does not depend on the particular geometry of the inner ring of the bearing. The present invention can be broadly applicable to the rotating parts of a rotary machine, which may not be necessarily those bearings described and shown herein, which are deemed to be merely illustrative of the best modes of the implementation of the invention. The invention rather, is intended to encompass all modifications which are within its spirit and scope as defined by the claims.

I claim:

1. A rotating bearing comprising:
   an outer ring defining an outer race;
   an inner ring defining an inner race;
   a plurality of rotating elements retained between the outer and inner races;
   an annular groove disposed in an annular inner surface of a rotating object of the rotary machine, the annular groove having in a cross-section, an open side towards a rotating axis of the rotating bearing, a first section radially distal from the open side and a second section radially between the open side and the first section;
   at least one radial passage to communicate with the annular groove and the inner race; and
   the at least one radial passage including an aperture in the annular groove located in the second section and the second section transitions smoothly from the aperture to the first section such that the first section of the annular groove communicates directly with the aperture to act as a reservoir when cooling and lubricant fluids under the centrifugal forces are collected in the annular groove and then delivered through the at least one radial passage into the area.

2. A rotating bearing as claimed in claim 1 wherein the cross-section of the annular groove is non-rectangular.

3. A rotating bearing as claimed in claim 2 wherein the aperture is defined in a sloped surface substantially continuously leading from the second section to the first section of the annular groove.

4. A rotating bearing as claimed in claim 3 comprising a plurality of radial passages to communicate with the annular groove and the inner race, each radial passage having an aperture in the annular groove located in the sloped surface leading from the second section to the first section thereof.

5. A rotating bearing as claimed in claim 4 wherein the plurality of rotating elements are a plurality of spheres.

6. A ball bearing comprising:
   an outer ring defining an outer race;
   an inner ring defining an inner race;
   a plurality of balls retained between the outer and inner races;
   an annular groove disposed on an innermost surface of the inner ring, the annular groove having in a cross-section thereof, an open side, a first section radially distal from the open side and a second section radially between the open side and the first section;
   a plurality of radial passages extending through the inner ring from the annular groove to the inner race, each of the radial passages having an aperture in the second section of the annular groove;
   wherein the cross-section of the annular groove is unsymmetrically non-rectangular relative to the radial passages; and
   wherein the apertures are positioned in a smooth transition surface of the second section leading to the first section of the annular groove.

7. A ball bearing as claimed in claim 6 wherein the cross-section of the annular groove is substantially triangular.

8. A ball bearing as claimed in claim 6 wherein the smooth transition comprises a sloped surface sloping substantially continuously from the second section to the first section of the annular groove.

9. A ball bearing as claimed in claim 8 wherein the radial passages are circumferentially and equally spaced apart from one another.

10. A ball bearing as claimed in claim 8 wherein the inner ring comprises a pair of juxtaposed first and second ring elements having flat surfaces abutting each other, the annular groove being jointly defined by the first and second ring elements.

11. A ball bearing as claimed in claim 10 wherein one of the first and second ring elements includes a plurality of grooves radially extending on the abutting surface through the ring element to form the radial passages when the first and second ring elements are placed together, thereby forming the inner ring.

12. A ball bearing as claimed in claim 11 further comprising a cage ring for retaining the balls circumferentially spaced apart from one another, the cage ring being disposed between the outer ring and the inner ring and supported on the inner ring.

13. A ball bearing as claimed in claim 12 wherein the cage ring is supported on an outermost surface of the first ring element, the first ring element having an outer diameter greater than an outer diameter of the second ring element when the ball bearing is under an axial load during operation.

14. A ball bearing as claimed in claim 13 wherein the first section of the annular groove is located at a side in the first ring element.

15. A ball bearing as claimed in claim 13 wherein the radially extending grooves are disposed in the abutting surface of the first ring element.

16. A ball bearing comprising:
   an outer ring defining an outer race;
   an inner ring including a pair of juxtaposed first and second ring elements having flat surfaces abutting each other, the first and second ring elements defining an inner race;
   a plurality of balls retained between the outer and inner races;
   a cage ring disposed between the outer ring and the inner ring for retaining the balls circumferentially spaced apart from one another;
   an annular groove disposed on an innermost surface of the inner ring at abutting edges of the first and second elements, the annular groove having a non-rectangular cross-section with an open side towards a rotating axis of the ball bearing, the non-rectangular cross-section being defined by first and second sections in a radially disposed relationship, the second section including the open side;
   a plurality of grooves radially extending on the abutting surface of one of the first and second ring elements therethrough to form radial passages between the annular groove and the inner race when the first and second ring elements are placed together, each of the radial passages having an aperture in the annular groove located in the second section of the annular groove such that the first section of the annular groove acts as a reservoir when cooling and lubricant fluids under a centrifugal pumping force are collected in the annular groove and then delivered through the radial passages into the inner race;
   wherein the first ring element is located in the ball bearing so that a predominate axial load applied externally to the ball bearing, in use, is transmitted between the first ring element and the outer ring, through the plurality of balls; and
   wherein the first section of the annular groove is defined in the first ring element.

17. A ball bearing as claimed in claim 16 wherein the cage ring is supported on an outermost surface of the first ring element, the first ring element having an outer diameter greater than an outer diameter of the second ring element when the ball bearing is under an axial load during operation.

18. A ball bearing as claimed in claim 17 wherein the radially extending grooves are disposed in the abutting surface of the first ring element.

19. A ball bearing as claimed in claim 16 wherein the number of the radial passages is predetermined by bearing size, speed and load.

* * * * *